United States Patent
Chung et al.

(10) Patent No.: US 9,768,429 B2
(45) Date of Patent: Sep. 19, 2017

(54) POUCH TYPE SECONDARY BATTERY HAVING SAFETY VENT

(71) Applicant: LG Chem, Ltd., Seoul (KR)

(72) Inventors: Seung Hyun Chung, Daejeon (KR); Sun Kyu Kim, Daejeon (KR); Cha Hwan Hwang, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 14/553,255

(22) Filed: Nov. 25, 2014

(65) Prior Publication Data

US 2015/0079436 A1  Mar. 19, 2015

Related U.S. Application Data

(63) Continuation of application No. PCT/KR2014/003691, filed on Apr. 25, 2014.

(30) Foreign Application Priority Data

May 2, 2013 (KR) .................. 10-2013-0049316

(51) Int. Cl.
H01M 2/12 (2006.01)
H01M 2/02 (2006.01)
H01M 2/08 (2006.01)

(52) U.S. Cl.
CPC ....... H01M 2/1211 (2013.01); H01M 2/0212 (2013.01); H01M 2/08 (2013.01);
(Continued)

(58) Field of Classification Search
CPC ............. H01M 2/1211; H01M 2/1252; H01M 2/1212; H01M 2/1223; H01M 2/08; H01M 2/12

See application file for complete search history.

(56) References Cited

U.S. PATENT DOCUMENTS

2007/0196733 A1* 8/2007 Lee .................. H01M 10/0525
429/185
2009/0081542 A1  3/2009 Yageta et al.
(Continued)

FOREIGN PATENT DOCUMENTS

JP  2006108097 A  4/2006
JP  2006332009 A  12/2006
(Continued)

OTHER PUBLICATIONS

International Search Report from PCT/KR2014/003691, dated Aug. 12, 2014.

*Primary Examiner* — Patrick Ryan
*Assistant Examiner* — Aaron Greso
(74) *Attorney, Agent, or Firm* — Lerner, David, Littenberg, Krumholz & Mentlik, LLP

(57) ABSTRACT

The present invention relates to a pouch type secondary battery. The pouch type secondary battery includes an electrode assembly, and a pouch type case in which the electrode assembly is accommodated, the pouch type case comprising a sealing part disposed on an edge thereof. The sealing part includes an inner sealing part forming a closed curve to protect the electrode assembly against the outside, and an outer sealing part defining a gas flow path between the inner and outer sealing parts to surround a peripheral portion of the inner sealing part, the outer sealing part having a safety vent.

9 Claims, 5 Drawing Sheets

(52) U.S. Cl.
CPC ........... *H01M 2/12* (2013.01); *H01M 2/1223* (2013.01); *H01M 2/1252* (2013.01)

(56) References Cited

U.S. PATENT DOCUMENTS

2010/0255368 A1    10/2010   Park et al.
2011/0151292 A1*   6/2011   Song .................. H01M 2/0275
                                                                       429/56

FOREIGN PATENT DOCUMENTS

| JP | 2007200717 A | | 8/2007 | |
|---|---|---|---|---|
| JP | 2011-507208 A | | 3/2011 | |
| KR | 2010-0005792 A | | 1/2010 | |
| KR | 20110039012 | * | 4/2011 | ............ H01M 10/04 |
| KR | 2011-0072733 A | | 6/2011 | |
| KR | 2011-0103079 A | | 9/2011 | |
| KR | 2012-0102935 A | | 9/2012 | |
| KR | 20120102953 A | | 9/2012 | |
| WO | 2006098242 A1 | | 9/2006 | |

\* cited by examiner

POUCH TYPE SECONDARY BATTERY HAVING SAFETY VENT

CROSS-REFERENCE TO RELATED APPLICATIONS

The present application is a continuation of International Application No. PCT/KR2014/003691 filed Apr. 25, 2014, which claims priority from Korean Patent Application No. 10-2013-0049316 filed May 2, 2013, the disclosures of which are hereby incorporated herein by reference.

TECHNICAL FIELD

The present invention relates to a pouch type secondary battery having a safety vent, and more particularly, to a pouch type secondary battery having a safety vent through which a gas is exhausted in only a predetermined direction.

BACKGROUND ART

In general, the demand for secondary batteries is rapidly increasing due to increased technical development of and demands for the mobile devices. Lithium (ion/polymer) secondary batteries having high energy density, operation voltage, and superior preservation and lifespan characteristics are widely used as energy sources for various mobile devices as well as electronic products.

A pouch type secondary battery improved in terms of safety is disclosed in Korean Patent Publication Gazette No. 2009-0065587. In the pouch type secondary battery of the related art, there is a channel formed in a cell and in a sealing part of an electrode tab. When gas is excessively generated in the pouch due to overcharging or an internal short circuit and increases the internal pressure of the pouch, the gas may be exhausted to the outside of the pouch through the channel. That is, since the gas is always exhausted through the sealing part of the electrode tab when the gas within the cell is exhausted, the direction in which the gas is exhausted may be predicted.

Of course, in the case of a specific electronic device or mechanical device, it is fine if gas is exhausted through a part adjacent to the electrode tab of the pouch type secondary battery.

Alternatively, in the case of another electronic device or mechanical device, a device sensitive to heat or gas may be disposed adjacent to the electrode tab of the pouch type secondary battery. Thus, in order to prevent the device sensitive to heat or gas from being damaged or corroded, the gas may be exhausted through another part that is not adjacent to the electrode tab of the pouch type secondary battery.

However, in order to mount the pouch type secondary battery disclosed in the above-described publication gazette into a mechanical or electronic device, the design of the mechanical or electronic device has to be changed so that the device sensitive to heat or gas is not disposed adjacent to the electrode tab. Therefore, such a pouch type secondary battery may not be mounted into a mechanical or electronic device for which a change in design is not possible.

SUMMARY OF THE INVENTION

Accordingly, the present invention aims at providing a pouch type secondary battery having a safety vent which is defined in any desired direction.

According to an aspect of the present invention, there is provided a pouch type secondary battery including: an electrode assembly; and a pouch type case in which the electrode assembly is accommodated, the pouch type case comprising a sealing part disposed on an edge thereof, wherein the sealing part includes: an inner sealing part forming a closed curve to protect the electrode assembly against the outside; and an outer sealing part defining a gas flow path between the inner and outer sealing parts to surround a peripheral portion of the inner sealing part, the outer sealing part having a safety vent.

A sealing surface of the outer sealing part may have a width greater than that of a sealing surface of the inner sealing part.

The sealing part may further include an intermediate sealing part disposed along the gas flow path in a state where the intermediate sealing part is spaced apart from both of the inner and outer sealing parts.

The sealing surface of the outer sealing part may have a width greater than that of a sealing surface of the intermediate sealing part, and the sealing surface of the intermediate sealing part has a width greater than that of the sealing surface of the inner sealing part.

The intermediate sealing part may form a closed curve.

The intermediate sealing part may have an intermediate vent for allowing the gas to flow between the inner sealing part and the outer sealing part.

The intermediate vent may be defined in a side opposite to the safety vent.

The safety vent may be constituted by a plurality of vents that are grouped.

According to the present invention, a pouch type secondary battery having a safety vent which is defined in any desired direction may be provided.

BRIEF DESCRIPTION OF THE DRAWINGS

The following drawings of the present invention will be described for explaining preferred embodiments of the invention to provide more general understandings of the present invention. Therefore, the preferred embodiments should be considered in descriptive sense only and not for purposes of limitation.

DETAILED DESCRIPTION OF THE INVENTION

Hereinafter, a pouch type secondary battery according to embodiments of the present invention will now be described more fully with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various modifications and equivalents may be made to take the place of the embodiments.

In addition, the sizes of the elements and the relative sizes between elements may be exaggerated for further understanding of the present invention. Also, the size of each element does not entirely reflect an actual size. In the following description of the present invention, a detailed description of known functions and configurations incorporated herein will be omitted to avoid making the subject matter of the present invention unclear.

<First Embodiment>

Figure 1:
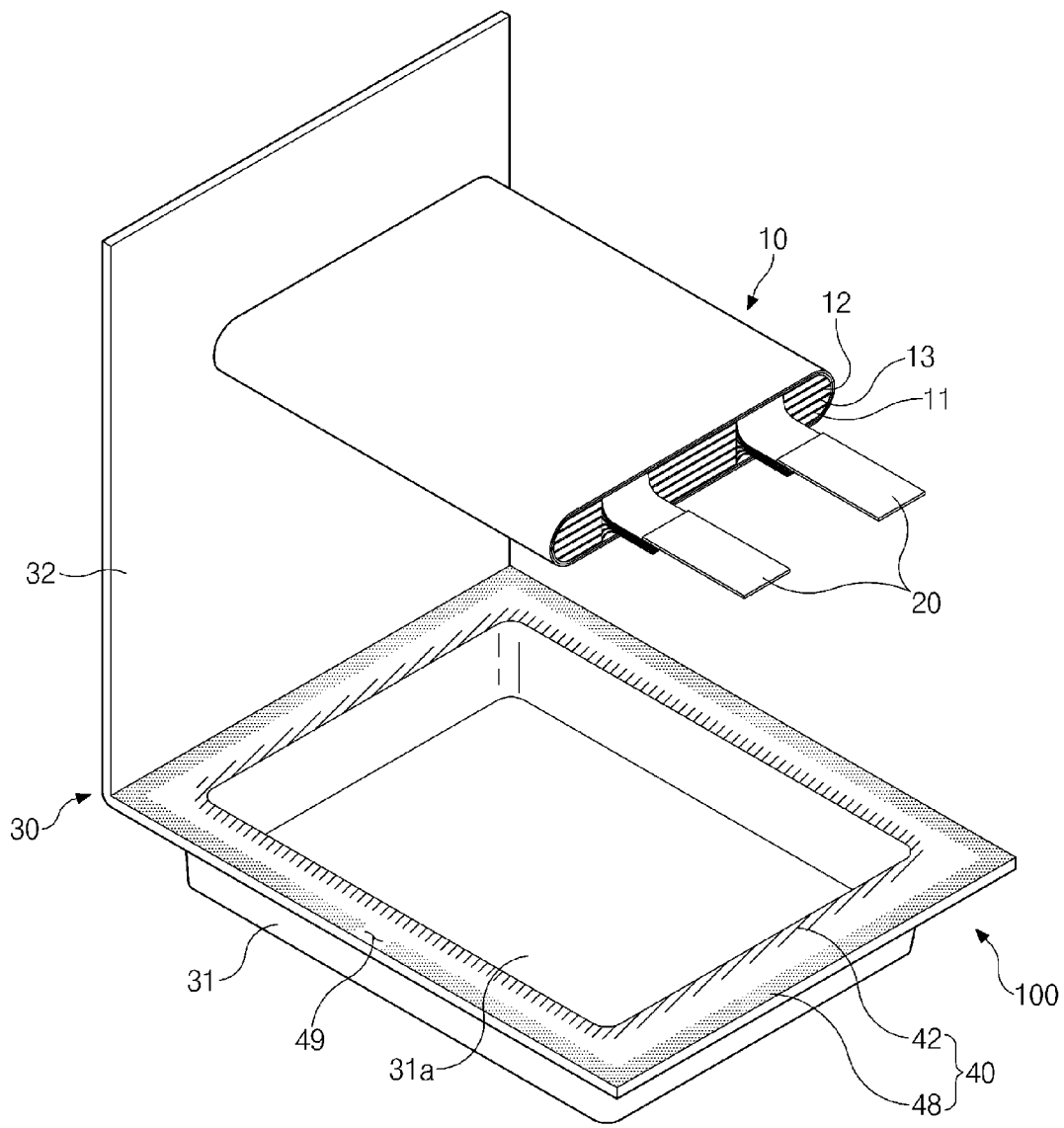
FIG. 1 is an exploded perspective view of a pouch type secondary battery according to a first embodiment.
Figure 2:
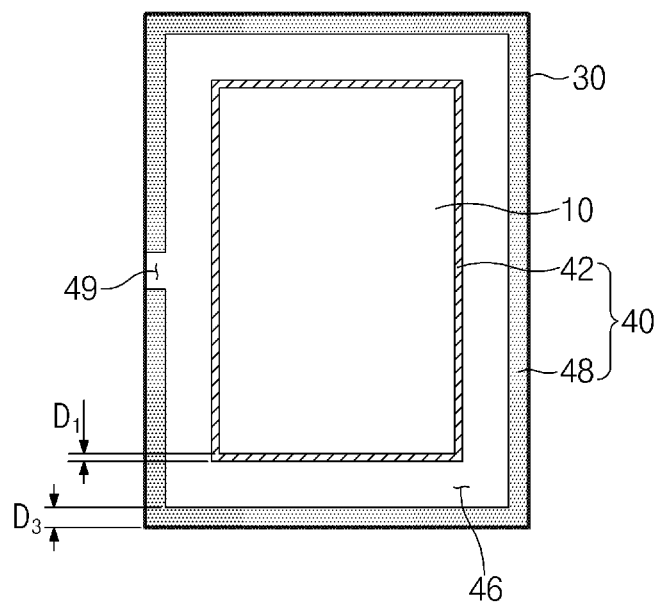
FIG. 2 is a schematic cross-sectional view of the pouch type secondary battery of FIG. 1 sectioned with respect to a sealing part.

FIG. 1 is an exploded perspective view of a pouch type secondary battery according to a first embodiment. In FIG. 2, an electrode lead 20 and an electrode tab are omitted.

Referring to FIGS. 1 and 2, a pouch type secondary battery 100 according to a first embodiment of the present invention includes an electrode assembly 10 and a pouch type case 30 in which the electrode assembly 10 is accommodated.

The electrode assembly 10 includes a first electrode plate 11, a second electrode plate 12, and a separator 13. Here, the electrode lead 20 is connected to the electrode tab extending from each of the first electrode plate 11 and the second electrode plate 12.

The pouch type case 30 includes an upper case 32 and a lower case 31. An accommodation part 31a defined in the pouch type case 30 may accommodate the electrode assembly 10.

A sealing part 40 is disposed on an edge of the pouch type case 30. In more detail, when the edge of the pouch type case 30 is sealed in a state where the lower case 31 is covered with the upper case 32 to face each other, the sealing part 40 may be disposed on the edge of the pouch type case 30.

The sealing part 40 includes an inner sealing part 42 and an outer sealing part 48.

The inner sealing part 42 forms a closed curve to protect the electrode assembly 10 against the outside.

The outer sealing part 48 may surround a peripheral portion of the inner sealing part 42 in a state where the outer sealing part 48 is spaced apart from the inner sealing part 42. A gas flow path 46 is defined between the inner sealing part 42 and the outer sealing part 48. The outer sealing part 48 includes a safety vent 49 for exhausting a gas to the outside. Thus, the outer sealing part 48 forms an open curve, unlike the inner sealing part 42.

Referring to FIG. 2, the electrode lead 20 and the electrode tab may be disposed on a short side of the electrode assembly 10 or a long side of the electrode assembly 10. Also, as illustrated in FIG. 1, the electrode lead 20 and the electrode tab may protrude from one side of the electrode assembly 10 in parallel with each other. Alternatively, the electrode lead 20 and the electrode tab may protrude from both sides of the electrode assembly 10, respectively. Thus, the safety vent 49 may be defined in any direction without being affected by the protruding directions of the electrode lead 20 and the electrode tab.

A sealing press may be used to seal the inner sealing part 42 and the outer sealing part 48. The sealing press may press the edge of the pouch type case 30 to seal the edge, thereby forming both of the inner and outer sealing parts 42 and 48 at the same time. Thus, a threshold in pressure at which the sealing part 40 is endured against an inner pressure of the pouch type case 30 may be proportional to a width of a sealing surface.

When the gas is excessively generated in the pouch due to an overcharge or internal short-circuit to increase the inner pressure of the pouch type case 30, and the inner pressure reaches a reference pressure, the inner sealing part 42 may be damaged. Thus, the inner sealing part may be randomly damaged according to a mounted state of the pouch type secondary battery 100 mounted on a mechanical or electronic device and an operating state of the pouch type secondary battery 100. That is, it is impossible to predict what portion of the inner sealing part 42 is damaged.

However, the gas may flow along the gas flow path 46 even though any portion of the inner sealing part 42 is damaged, and thus the gas may be exhausted through the safety vent 49 defined in the outer sealing part 48 to the outside.

When a position of the safety vent 49 is determined, it is unnecessary to dispose the safety vent 49 in only the vicinity of the electrode lead 20 or the electrode tab. Thus, even though a device that is sensitive to heat or gas is disposed in the vicinity of the electrode lead 20 or the electrode tab of the pouch type secondary battery 100, the safety vent 49 may be disposed away from the device that is sensitive to the heat or gas.

Also, a moment in which the inner sealing part 42 is damaged may be considered. Even though the inner sealing part 42 is damaged to momentarily apply a strong pressure by the gas to the gas flow path 46, the outer sealing part 48 may be maintained without being damaged.

When a sealing surface of the outer sealing part 48 of the pouch type secondary battery 100 according to the first embodiment has a width D3 greater than that D1 of a sealing surface of the inner sealing part 42, damage of the inner sealing part 42 that may occur together at the moment of damage of the inner sealing part 42 may be prevented, and also the gas may be exhausted through only the safety vent 49 to the outside.

<Second Embodiment>

Figure 3:
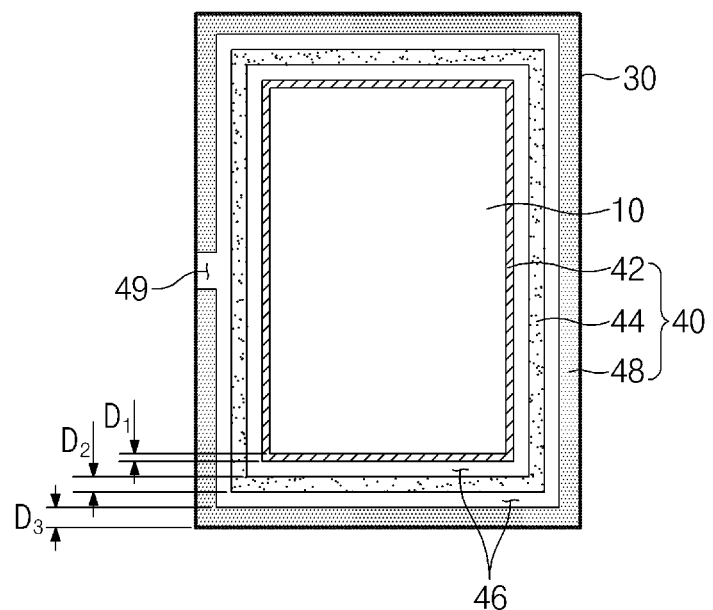
FIG. 3 is a schematic cross-sectional view of a pouch type secondary battery with reference to a sealing part according to a second embodiment of the present invention.

FIG. 3 is a schematic cross-sectional view of a pouch type secondary battery with reference to a sealing part according to a second embodiment of the present invention. In FIG. 3, the electrode lead 20 and the electrode tab are not shown. Also, duplicate descriptions with respect to the first embodiment will be substantially omitted so as to avoid repeated descriptions, and different parts therebetween will be mainly described.

Referring to FIG. 3, a pouch type secondary battery 100A according to a second embodiment of the present invention is different from that 100 according to the first embodiment in terms of a configuration of a sealing part 40.

That is, the sealing part 40 further includes an intermediate sealing part 44 in addition to an inner sealing part 42 and an outer sealing part 48. The intermediate sealing part 44 is disposed along a gas flow path 46 in a state where the intermediate sealing part 44 is spaced apart form both of the inner and outer sealing parts 42 and 48. Thus, the gas flow path 46 may be partitioned into plural flow paths.

Also, in the case of the pouch type secondary battery 100A according to the second embodiment, a sealing surface of the sealing part 48 may have a width D3 greater than that D2 of a sealing surface of the intermediate sealing part 44. In addition, the sealing surface of the intermediate sealing part 44 may have a width D2 greater than that D1 of a sealing surface of the inner sealing part 42. The intermediate sealing part 44 forms a closed curve.

Thus, damage of the intermediate sealing part 44 that may occur together at the moment of damage of the inner sealing part 42 may be prevented. Also, damage of the outer sealing part 48 that may occur together at the moment of the damage of the intermediate sealing part 44 by an increase in pressure due to the gas may be prevented.

Further, since the inner sealing part 42 and the intermediate sealing part 44 are damaged in stages, a pressure when the gas is exhausted to the outside may be reduced in stages.

<Third Embodiment>

Figure 4:
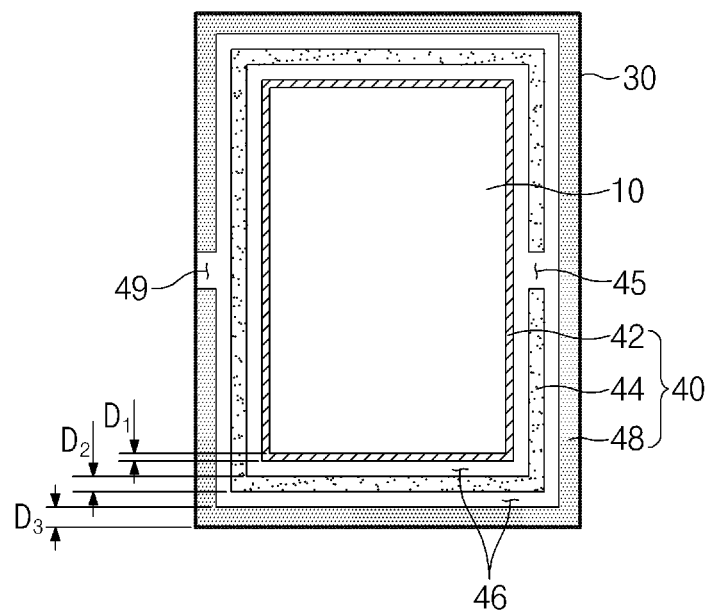
FIG. 4 is a schematic cross-sectional view of a pouch type secondary battery with reference to a sealing part according to a third embodiment of the present invention.

FIG. 4 is a schematic cross-sectional view of a pouch type secondary battery with reference to a sealing part according to a third embodiment of the present invention. In FIG. 4, the electrode lead 20 and the electrode tab are not shown. Also, duplicate descriptions with respect to the second embodiment will be substantially omitted so as to avoid repeated descriptions, and different parts therebetween will be mainly described Referring to FIG. 4, a pouch type secondary battery 100B according to a third embodiment of the present invention is different from that 100A according to the second embodiment in terms of a configuration of a sealing part 44.

That is, the central sealing part 44 includes an intermediate vent 45. The intermediate vent 45 may allow a gas to flow between an inner sealing part 42 and an outer sealing part 48.

In the third embodiment, at the moment of damage of the inner sealing part 42, the gas may flow through an inner gas flow path 46 of a gas flow path 46 that is partitioned into plural flow paths. Then, the gas flows again through the intermediate vent 45. Finally, the gas is exhausted to the outside through the safety vent 49.

When compared that the pressure when the gas is exhausted to the outside is reduced in stages due to the damage of the inner and intermediate sealing parts 42 and 44 in stages in the second embodiment, the gas may be reduced in pressure while the gas flows through the inner gas flow path 46 and the outer gas flow path 46 in the third embodiment.

Also, as illustrated in FIG. 4, when the intermediate vent 45 is defined in a side opposite to the safety vent 49, a flow distance of the gas until the gas is exhausted to the outside may be maximized. Here, the opposite side of the safety vent 49 may represent a geometrical opposite side in a strict sense as wall as a comprehensive case in which the safety vent 49 is defined in a right side of the intermediate sealing part 44.

<Fourth Embodiment>

Figure 5:
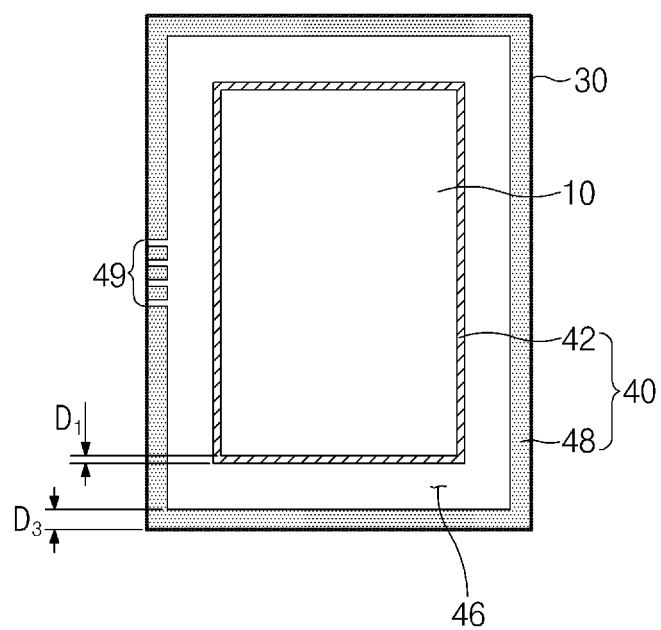
FIG. 5 is a schematic cross-sectional view of a pouch type secondary battery with reference to a sealing part according to a fourth embodiment of the present invention.

FIG. 5 is a schematic cross-sectional view of a pouch type secondary battery with reference to a sealing part according to a fourth embodiment of the present invention. In FIG. 5, the electrode lead 20 and the electrode tab are not shown. Also, duplicate descriptions with respect to the first embodiment will be substantially omitted so as to avoid repeated descriptions, and different parts therebetween will be mainly described.

Referring to FIG. 5, a pouch type secondary battery 100C according to a fourth embodiment of the present invention is in different from that 100 according to the first embodiment in terms of a configuration of a safety vent 49.

That is, the safety vent may be constituted by a plurality of vents that are grouped.

If it is assumed that the safety vent 49 according to the fourth embodiment has the same area as that of the safety vent 49 according to the first embodiment, gas discharge rates to the outside may be the same. However, in the fourth embodiment, since each of the vents has a relatively small size, possibility in introduction of foreign substances into the gas flow path 46 may be less.

Technical ideas of the fourth embodiment may be equally applied into the first, second, and third embodiments.

The description of the present invention is intended to be illustrative, and those with ordinary skill in the technical field of the present invention pertains will be understood that the present invention can be carried out in other specific forms without changing the technical idea or essential features.

The invention claimed is:

1. A pouch type secondary battery comprising:
   an electrode assembly electrically coupleable to at least one electrode lead; and
   a pouch type case in which the electrode assembly is accommodated, the pouch type case comprising an upper case and a lower case, the lower case including a sealing part having four sides defining a rectangular perimeter enclosing the electrode assembly, the at least one electrode lead protruding from a first side of the four sides,
   wherein the sealing part comprises:
   an inner sealing part forming a closed curve surrounding the electrode assembly to protect the electrode assembly against the outside; and
   an outer sealing part spaced away from the inner sealing part and defining a gas flow path between the inner and outer sealing parts to surround a peripheral portion of the inner sealing part, the outer sealing part having a safety vent in communication with the gas flow path, the safety vent being disposed on a second side of the four sides, the second side being adjacent the first side, wherein the sealing part further comprises an intermediate sealing part surrounding the inner sealing part and disposed along the gas flow path in a state where the intermediate sealing part is spaced apart from both of the inner and outer sealing parts.

2. The pouch type secondary battery of claim 1, wherein a sealing surface of the outer sealing part has a width greater than that of a sealing surface of the inner sealing part.

3. The pouch type secondary battery of claim 1, wherein the sealing surface of the outer sealing part has a width greater than that of a sealing surface of the intermediate sealing part, and the sealing surface of the intermediate sealing part has a width greater than that of the sealing surface of the inner sealing part.

4. The pouch type secondary battery of claim 1, wherein the intermediate sealing part forms a closed curve.

5. The pouch type secondary battery of claim 1, wherein the safety vent is constituted by a plurality of vents that are grouped.

6. The pouch type secondary battery of claim 1, wherein the first side and the second side share a corner.

7. The pouch type secondary battery of claim 1, wherein the first side and the second side are perpendicular.

8. The pouch type secondary battery of claim 1, wherein the safety vent is disposed on only one side.

9. The pouch type secondary battery of claim 1, wherein the safety vent is configured to always be in an open position.

* * * * *